United States Patent Office 3,533,145
Patented Oct. 13, 1970

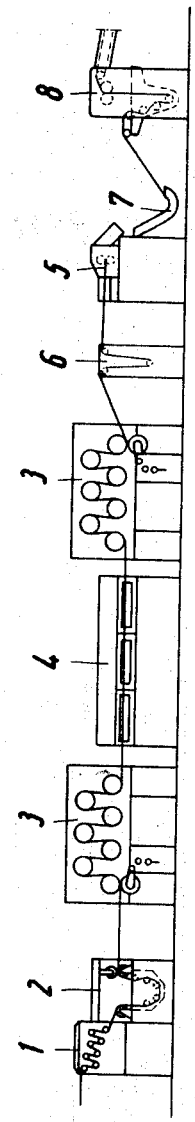
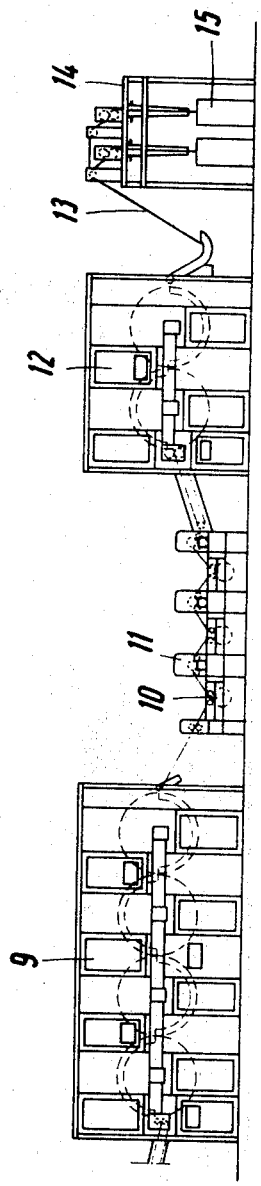

3,533,145
PROCESS AND APPARATUS FOR THE TREATMENT OF SYNTHETIC FILAMENT GROUPS
Heinz Fleissner, Frankfurt am Main, Germany, assignor to Vepa AG, Basel, Switzerland
Continuation-in-part of application Ser. No. 676,780, Oct. 20, 1967. This application Dec. 23, 1968, Ser. No. 786,042
Int. Cl. D02g 1/00
U.S. Cl. 28—1.2
16 Claims

ABSTRACT OF THE DISCLOSURE

The present disclosure is directed to a process and apparatus for the continuous pad-dyeing or printing of continuous synthetic filament groups with dyestuffs which set under the influence of heat which comprises producing a crimp in the synthetic filament groups being treated, padding or printing said filament groups with a treatment liquor containing dyestuffs and other auxiliary agents before the crimp is set, and drying and setting both the crimp in the fibers of the filament groups and the dyestuffs in a single step by passing a treatment medium which has been heated to a temperature of about 170 to 230° C. through said filament groups.

BACKGROUND OF THE INVENTION

The present application is a continuation-in-part application of application Ser. No. 676,780, filed Oct. 20, 1967.

The present invention relates to a process and apparatus for the continuous pad-dyeing or printing of continuous synthetic filament groups, for example tow and slivers of synthetic staple fiber with dyestuffs which react under the influence of heat. A gas, preferably air, which has been heated to a temperature of about 170 to 230° C. is passed through the filament groups or slivers which have been printed or padded with the perforations which contain said dyestuffs and sometimes thickeners and other common auxiliary agents and which have possibly been dried. The present invention is particularly directed to the treatment of polyester fibers.

Up to now, either the spinning slurry of polyesters or the ready fiber could be dyed by using the conventional full bath method. Furthermore, polyester fabrics are dyed using the Thermosol process wherein a short time heat-setting in hot air is utilized. When dyeing the spinning slurry, it is difficult to mix the suitable pigments uniformly into the highly viscous slurry. This applies to the production of granulates as well as to continuous re-esterification and polycondensation. The very delicate melt spinning might be considerably disturbed by the intercalation of pigments. When changing colors, serious production losses result apart from the heavy material loss. In general, this process is therefore used only for black colors.

In the parent application a process and apparatus for the Thermosol-dyeing of synthetic polymers, for example polyesters are described. This Thermosol process is very economical and produces a very uniform color turnout. A rapid color change permits the economical treatment of also smaller batches of for example 500 kg. and less, so that colored polyester tow and flock can be supplied to the subsequent process stage. As compared with the conventional dyeing method, the Thermosol process has the advantage that hardly any oligomeres are formed, as in the classical dyeing processes. These small particles are formed during the high-temperature treatment of the fiber, especially in a moist medium. If high temperatures are applied for a long time, these particles migrate to the surface of the fiber. There they tend to affect rubbing fastness of the dyeing and thus cause the development of considerable dust quantities in further processing. Moreover, the fiber surface is rendered rough, so that proper drafting of the roving in the ring spinning mill is no longer possible. Increased thread breakage is the consequence. It has been found that the aforementioned disadvantages can be avoided and simultaneously a better yarn quality can be obtained if the tows are Thermosol-dye.

During the entire Thermosol-dyeing process, the tows are guided flat and in parallel, so that no capillary entangling and interlacing occur. Thus further effective processing on the converter, the tearing machine or the cutting machine is ensured, if the tows are fed from cartons, into which they have been orderly packed and in which they have been compressed, so that the re-combing which is necessary after the conventional dyeing processes becomes superfluous.

SUMMARY OF THE INVENTION

An object of the present invention is to avoid the prior art disadvantages in the dyeing of continuous synthetic filament groups with dyestuffs which set under the influence of heat.

Another object of the present invention is to provide an improved process and apparatus for dyeing synthetic filament groups using the Thermosol process wherein the fiber quality is enhanced and the economy of the process substantially improved.

A further object of the present invention is to provide an improved process and apparatus for the continuous dyeing of synthetic filament groups which eliminates intermediate packing processes and substantially avoids entangling of the individual filaments.

A still further object of the present invention is to provide an improved process and apparatus for continuously dyeing synthetic filament groups wherein uniform setting of the fiber and the crimp as well as an accurate color matching is achieved.

Another object of the present invention is to provide an apparatus for the continuous dyeing of synthetic filament groups which is suitable for high operating speeds, such as for example about 100 m./min. and more.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the continuous dyeing of synthetic filament groups may be obtained by combining the pad-dyeing process with the fiber production, especially if polyesters fibers are being treated. It is of particular advantage if the preparations which contain the dyestuffs and auxiliary agents are applied onto the tow before the crimp is set, and if the setting of the crimp and the setting of the dyestuff are accomplished in one single process. When compared with a separate fiber setting and dyestuff setting, elimination of apparatus can be effected and only about one-half of the power is required.

The materials which can be treated by the process and apparatus of the present invention include any of the synthetic filaments or blends of synthetic filaments with other synthetic filaments or cellulose filaments. The synthetic fibers may comprise synthetic polymers such as polyolefins, for example, polyethylene, polypropylene, etc., polyamides, for example, nylon 6 obtained by the condensation of caprolactam, nylon 66 obtained by the condensation of hexamethylenediamine with adipic acid, etc., polyesters, for example, polyethylene terepthalate, etc., phenolic resins, for example, phenol formaldehyde resins, urea formaldehyde resins, etc., polyvinyl materials, for example, polyvinyl chloride, polyvinyl acetate, etc., acrylate resins, for example polymethylmethacrylate, copolymers of these materials with one another or with ethylenically unsaturated monomers, and similar type polymers. The present invention is particularly applicable to polyester fibers or blends of polyesters fibers with, for example cellulose fibers.

A particular advantage is the continuous treatment of the synthetic filament groups, especially polyesters, by utilizing the following process steps:

(1) Humidifying and finishing;
(2) Hot-stretching;
(3) Crimping;
(4) Application of the dyeing preparations;
(5) Drying and setting of the fibers and the dyestuffs;
(6) Application of the preparations for converting or tearing and spinning; and
(7) Drying.

As to the apparatus for carrying out the process of the present invention, the combination and the joint control of the following devices are suggested:

(1) A roller arrangement for the formation of a uniform ribbon of the synthetic filament groups;
(2) A finishing and humidifying bowl;
(3) At least two drawing units;
(4) At least one heating duct between the drawing unit;
(5) A crimping device with preceding compensating roller control and preferably with a subsequent material accumulator;
(6) An applicator, especially a padder;
(7) A drying and heat-setting device especially with sieve drums subjected to a suction draft as the conveying elements;
(8) A device for the application of the preparation;
(9) A drying device, especially with sieve drums subjected to a suction draft as the conveying elements; and
(10) A tow packing unit.

Instead of a tow packing unit also a tow cutting or tearing device and a subsequent baling press can be provided, if dyed staple fiber is to be produced.

BRIEF DESCRIPTION OF THE DRAWINGS

The present invention will become more fully understood from the detailed description given hereinbelow and the accompanying drawings which are given by way of illustration only and thus are not limitative of the present invention and wherein, FIGS. 1a and 1b define the apparatus of the present invention.

DESCRIPTION OF THE PREFERRED EMBODIMENTS

Referring now to the drawings, the apparatus of the present invention comprises a roller arrangement 1, and a bowl 2 for the application of a finishing agent and for equalizing the humidity of the tow. Drawing units 3 and a heating duct 4 are disposed between said drawing units and are followed by a crimping device 5 to which a compensating roller control 6 and a material accumulator 7 are associated. Behind the crimping device 5 a padder 8 is set up for dyeing the synthetic filament groups and a sieve drum device 9 is provided for drying the dyeing liquor and for heat-setting the fibers and the dyestuffs. Then, sieve drum wash bowls 10 with subsequent squeezers 11 follow. The last bowl serves for applying a preparation. After having passed a sieve drum drier 12, synthetic filament groups 13 are folded into a container 15 by means of a tow packing unit 14.

With the apparatus according to the present invention, an unequalled uniform setting of the fiber and the crimp as well as an accurate color matching is possible. Such a plan is also suitable for high operating speeds of about 100 m./min. and more. Smaller batches of 500 kg. and less can be dyed to one particular shade without difficulty. Since intermediate packing processes are eliminated, an entangling of the filaments is absolutely impossible, and the fiber quality is substantially improved.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. A process for the continuous pad-dyeing or printing of continuous synthetic filament groups with dyestuffs which set under the influence of heat which comprises producing a crimp in the synthetic filament groups being treated, padding or printing said filament groups with a treatment liquor containing dyestuffs and other auxiliary agents before the crimp is set, and drying and setting both the crimp in the fibers of the filament groups and the dyestuffs in a single step by passing a treatment medium which has been heated to a temperature of about 170–230° C. through said filament groups.

2. The process of claim 1, wherein the synthetic filament groups are tow and slivers of polyester fibers.

3. A process for the continuous pad-dyeing or printing of continuous synthetic filament groups with dyestuffs which set under the influence of heat by combining the pad-dyeing process with the fiber production which comprises applying a finishing agent to the filament groups and equalizing the humidity of said filaments, hot-stretching the filament groups by drawing them through a heating zone producing a crimp in the synthetic filament groups, padding or printing said filament groups with a treatment liquor containing dyestuffs and other auxiliary agents before the crimp is set and drying and setting both the crimp in the fibers of the filament groups and the dyestuff in one single step by passing air which has been heated to a temperature of about 170–230° C. through said filament groups.

4. The process of claim 3, wherein after drying and setting the filament fibers and the dyestuffs, preparations are applied to the filament groups for converting or tearing and spinning said groups followed by a subsequent second drying.

5. The process of claim 4, wherein the filament groups are washed prior to the application of said preparations.

6. The process of claim 4, wherein drying is effected by conveying the filament groups on the surface of sieve drums subjected to a suction draft.

7. The process of claim 4, wherein following the second drying the filament groups are packed into a container.

8. The process of claim 3, wherein prior to humidifying and finishing, the synthetic filament groups are conveyed on a plurality of rollers for the formation of a uniform ribbon of said synthetic filament groups.

9. The process of claim 3, wherein the synthetic filament groups are hot-stretched by conveying them over a plurality of drawing elements, through a heating zone and over a second plurality of drawing elements.

10. An apparatus for the continuous pad-dyeing or printing of continuous synthetic filament groups which comprises, in combination, a means for producing a crimp in the synthetic filament groups, padding or printing means for treating the filament groups with a treatment liquor containing dyestuffs and other auxiliary agents before the crimp is set, and means for drying and setting both the crimp and the dyestuff in a single step by conveying said filament groups on the surface of at least one sieve drum means while passing a treatment medium which has been heated to a temperature of about 170–230° C. through said filament groups.

11. An apparatus for the continuous pad-dyeing or printing of continuous synthetic filament groups which comprises, in combination, a finishing and humidifying bowl, followed by at least two drawing units, at least one heating means disposed between said drawing units, a means for producing a crimp in the synthetic filament groups, padding or printing means for treating the filament groups with a treatment liquor containing dyestuffs and other auxiliary agents, means for drying and setting both the crimp and the dyestuff in a single step by conveying said filament groups on the surface of at least one sieve drum means while passing a treatment medium which has been heated to a temperature of about 170–230° C. through said filament groups, a washing means containing at least one sieve drum means subjected to a suction draft, a means for the application of the preparation, another drying means containing at least one sieve drum means subjected to a suction draft as the conveying element and a packing means for folding the filament groups into a container.

12. The apparatus of claim 11, wherein before the finishing and humidifying bowl, a plurality of roller means are provided for the formation of a uniform ribbon of the synthetic filament groups.

13. The apparatus of claim 12, wherein the drawing units are a plurality of roller means and the heating means is a heat duct.

14. The apparatus of claim 13, wherein a compensating roller control means is provided in front of the crimping means and a material accumulator is provided subsequent to said crimping means.

15. The apparatus of claim 14, wherein the washing means are provided with subsequent dehydration units.

16. The apparatus of claim 11, wherein the packing means is replaced with a cutting means and a subsequent baling press.

References Cited
UNITED STATES PATENTS

| | | |
|---|---|---|
| 3,070,869 | 1/1963 | Shaw. |
| 3,135,039 | 6/1964 | Mattson. |
| 3,293,675 | 12/1966 | Willis. |
| 3,380,131 | 4/1968 | Gray. |

FOREIGN PATENTS

| | | |
|---|---|---|
| 260,752 | 7/1965 | Australia. |

LOUIS K. RIMRODT, Primary Examiner

U.S. Cl. X.R.

28—72.1, 75